May 22, 1956     A. VAN DUYN     2,746,814
KNIFE AND BEARING STRUCTURE FOR WEIGHING SCALES
Filed June 26, 1951
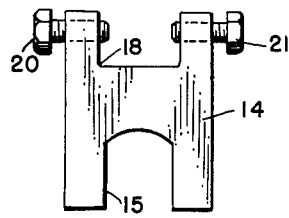
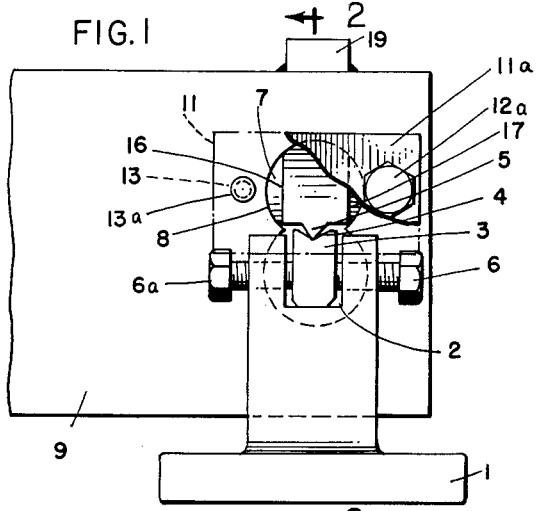
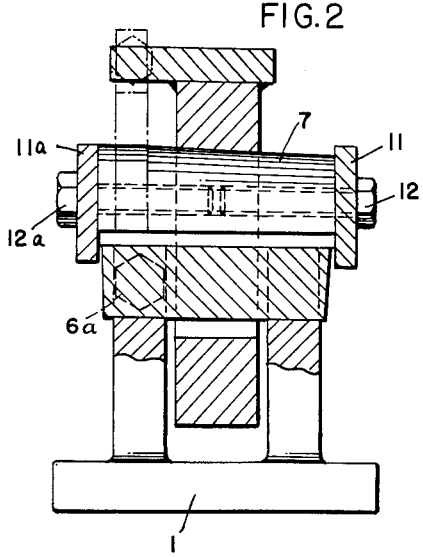
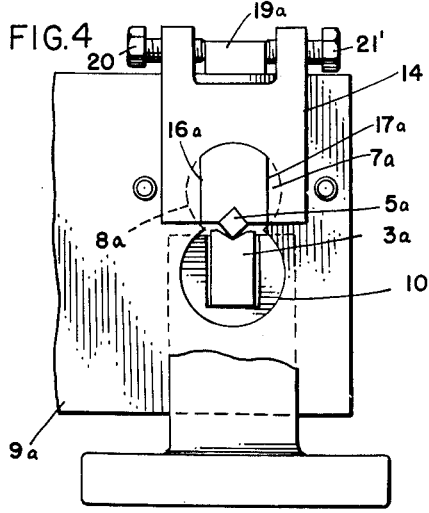
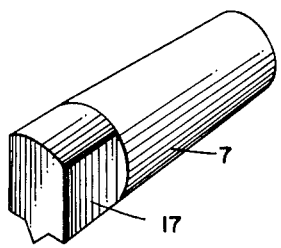
INVENTOR.
ADRIANUS VAN DUYN
BY
Spencer, Johnston, Cook & Root
ATT'YS United States Patent Office 2,746,814
Patented May 22, 1956

2,746,814

KNIFE AND BEARING STRUCTURE FOR WEIGHING SCALES

Adrianus van Duyn, Hillegersberg, Rotterdam, Netherlands, assignor to U. S. Slicing Machine Company, Inc., La Porte, Ind., a corporation of Indiana Application June 26, 1951, Serial No. 233,506

Claims priority, application Netherlands July 8, 1950

4 Claims. (Cl. 308—2)

This invention relates to a new and improved knife and bearing structure for the weighing lever of a weighing scale.

One of the objects of the invention is to provide a new and improved knife and bearing structure which is particularly useful in heavy duty weighing scales.

Another object of the invention is to provide a new and improved weighing bridge or other lever structure belonging to a scale supported by a knife in which the knife is part of a shank or journal having a circular cross section over substantially its whole length and wherein the bearing upon which the knife rests is fitted into a substantially identical hole or opening of the weigh bridge or weighing lever.

Another object of the invention is to simplify and improve the manner in which the knife is positioned in a weighing lever of the type previously described.

Still a further object of the invention is to provide a new and improved way of tightening the shank or journal of the knife in the weighing bridge.

Other objects and advantages of the invention will become apparent by reference to the following description in conjunction with the accompanying drawings, in which Fig. 1 is a front elevational view with parts broken away of a weighing lever having one form of knife and bearing structure provided in accordance with this invention;

Fig. 2 is a section through the line 2—2 of Fig. 1;

Fig. 3 is a front view of a key for rotating the knife around the longitudinal axis of its associated shaft or journal;

Fig. 4 is a front elevational view with the front end plate removed of a modified form of the structure shown in Fig. 1;

Fig. 5 is an isometric view of the knife element illustrated in Fig. 1 and its associted tapered shaft or conical journal.

In Figs. 1 and 2 a bracket 1 is rigidly mounted onto the frame of the weighing apparatus. On the bottom of a recess 2, mounted in the bracket 1, a bearing 3 is placed, said bearing being provided with a V-shaped groove 4 for a knife 5.

The bearing 3 is held laterally by means of two bolts 6 and 6a by means of which the bearing may be adjusted transversely by loosening one of the bolts and tightening the other one.

In the structure illustrated in Figs. 1, 2, 3 and 5, the knife 5 is a part of a conical journal 7 which is placed in an identically shaped hole 8 of the weighing lever 9.

In the device illustrated in Fig. 4 conical journal 7a, means forming a hole 8a, knife 5a and bearing 3a are shown. The bearing 3a is disposed in the uniform diameter hole 10 to permit shiftable adjustable movement therein and to permit relative rotative movement of the knife 5a. The knife may either be one body with the journal 7 as shown in Fig. 1, or the knife may be placed as a separate unit in the journal as shown in Fig. 4 (knife 5a). In the latter case the knife has a square section and is placed in a square recess of the journal. By virtue of this construction it is possible to replace the knife edge with another knife edge, such that it cooperates with the bearing 3a, when the knife edge is worn down unduly. The weight of the parts pressing on the knife edge pushes the knife into the square recess.

By the use of the conical journal 7 it is possible to fasten the knife tightly in the weighing lever without any special means such as wedges or similar bodies and such that play which occurs when using cylindrical journals cannot take place.

By the use of the clamp device consisting of two plates 11 and 11a which are fastened by means of bolts 12, 12a, 13 and 13a, the journal may be moved by pressure on the opposite faces of the journal so that it is possible to push the conical journal 7 in the hole and to release it. By loosening the bolts 12 and 13 and by tightening the bolts 12a and 13a the journal will be tightened, whereas the reverse operation will make the journal free from its seat.

The key 14, as shown in Fig. 3, is provided with a recess 15 by means of which the key may be placed on the journal 7. The journal 7 is provided near the thick end with flat lateral faces 16 and 17 (16a and 17a in Fig. 4), such that the key 14 will fit onto these.

A second recess 18 in the key 14 cooperates with an extension 19 (19a in Fig. 4) on the weighing lever 9 (9a in Fig. 4). The extension 19 cooperates with bolts 20 and 21 so that by tightening one of these bolts and loosening the other one, the journal 7 may be rotated around its longitudinal axis and thereby the knife may be adjusted and aligned with the bearing.

It is of course not necessary that all knife bearings of the weighing scale are constantly provided with said key. It is sufficient that the serviceman, who places or has to readjust a weighing apparatus, has the key with him.

It is also apparent that a given weighing scale may have as many such knife and bearing assemblies as are necessary to support the weighing lever or levers.

It will be understood that the bearing member can also be supported on a conical journal or shaft and can be adjusted in substantially the same manner as the knife member. In other words, the mounting means for at least one of said members comprises a conical journal or shaft.

The conically shaped shank or journal 7 makes it possible to tighten the knife in the weighing bridge or weighing lever without the use of keying elements, wedges or other similar means and to prevent the possibility of backlash or play which sometimes occurs with a cylindrical shank. The manner in which the conical shank or journal can be fastened and released by an axial pressure thereupon applied by clamping means upon opposite ends of the shank is exceedingly simple. The rotation or turning of the knife and holding it in position during adjustment by the employment of two vertical surfaces substantially parallel to the longitudinal axis of the shank to serve as a grip for a key also provides a very simple method of adjustment.

The invention is hereby claimed as follows:

1. A knife and bearing structure for scales and the like embodying a bearing member and a knife member, the bearing member being adapted to receive the knife edge of said knife member, mounting means for the knife member comprising a conical shaft, means in a weighing lever forming a hole the sides of which provide a seat for said shaft, the opposite ends of said shaft protruding from said hole, means comprising end plates and screws cooperating with said weighing lever and capable of adjustment to move said shaft axially to tighten and loosen said shaft, flat sides on an end of said shaft to permit gripping for rotatable adjustment of said knife about the axis of said shaft after it has been loosened axially, an extension on said weighing lever, means comprising a key provided with recesses, the sides of one of said key recesses being adapted to engage said flat sides of said shaft and the sides of said other key recess being adapted to fit partially around said extension, and opposing key screws extending transversely through said last named sides and adapted to engage said extension transversely whereby when one of said key screws is loosened and the other is tightened said shaft is turned provided it has been loosened axially.

2. A knife and bearing structure for weighing scales and the like embodying a bearing member and a knife member, the bearing member being adapted to receive the knife edge of said knife member, mounting means for at least one of said members comprising a conical journal, means including a pair of intersecting holes in a weighing lever, both holes extending from side to side of said lever, the sides of one of said holes providing a seat for said journal and the other hole being adapted to receive the other of said members, said conical journal projecting beyond the opposite sides of said weighing lever, and means comprising end plates mounted opposite the ends of said journal and fastened to said weighing lever by fastening means being capable of adjustment to move said end plates toward and away from said weighing lever in contact with an end of said journal thereby to move said journal axially to tighten and loosen it.

3. A knife and bearing structure for weighing scales and the like embodying a bearing member and a knife member, the bearing member being adapted to receive the knife edge of said knife member, mounting means for at least one of said members comprising a conical journal, means including a pair of intersecting holes in a weighing lever, both holes extending from side to side of said lever, the sides of one of said holes providing a seat for said journal and the other hole being adapted to receive the other of said members, said journal projecting beyond the side of said weighing lever and the projecting portion being flattened on opposite sides, an extension on said weighing lever, and means adapted to be fastened to said extension and to the flat sides of said journal to partially rotate said journal.

4. In a weighing scale having a scale support and a weighing lever provided with an opening therein extending through the lever, means to support said lever on said scale support and including a journal member conforming in shape to a part of the opening at one side of said opening, a bearing member in the opening at the other side of said opening, one of said members being tapered to lock it in its conforming part of the opening, the other member being free to rotate about its longitudinal axis in the other part of the opening, and a knife edge for said journal member and receivable in a groove in the bearing member, engageable means at the opposite ends of the journal member to shift the journal member axially in either direction to loosen or tighten the journal in its opening, screw means to operate the engageable means, and threaded means to adjustingly shift the bearing member transversely of its axis.

References Cited in the file of this patent

UNITED STATES PATENTS

| | | |
|---|---|---|
| 1,426,393 | King | Aug. 22, 1922 |
| 1,463,423 | Hem | July 31, 1923 |
| 1,571,265 | Hartman | Feb. 2, 1926 |
| 1,588,455 | Hem | June 15, 1926 |
| 1,732,163 | Hurt | Oct. 15, 1929 |
| 1,785,382 | Hurt | Dec. 16, 1930 |
| 1,806,179 | Reeves | May 19, 1931 |
| 1,916,993 | Schumaker | July 4, 1933 |
| 2,345,783 | Wirth | Apr. 4, 1944 |

FOREIGN PATENTS

| | | |
|---|---|---|
| 346,059 | Great Britain | Apr. 9, 1931 |
| 885,422 | France | Sept. 14, 1943 |